United States Patent [19]

Pastor et al.

[11] 4,097,350

[45] Jun. 27, 1978

[54] ACTINIC RADIATION CURABLE COMPOSITIONS

[75] Inventors: Stephen D. Pastor, Edison; Martin M. Skoultchi, Somerset; Henry R. Hernandez, Somerville, all of N.J.

[73] Assignee: National Starch and Chemical Corporation, Bridgewater, N.J.

[21] Appl. No.: 588,398

[22] Filed: Jun. 19, 1975

Related U.S. Application Data

[63] Continuation-in-part of Ser. No. 453,817, Mar. 22, 1974, abandoned.

[51] Int. Cl.$^2$ .............................................. C08F 2/46
[52] U.S. Cl. ............................ 204/159.23; 427/54; 428/442; 428/463; 428/483; 428/522; 428/537; 526/271; 526/273
[58] Field of Search ............ 204/159.23, 159.15, 204/159.22; 427/54; 96/115 R; 526/271, 273

[56] References Cited

U.S. PATENT DOCUMENTS

| | | | |
|---|---|---|---|
| 3,661,614 | 5/1972 | Bassemir et al. | 204/159.23 |
| 3,690,927 | 9/1972 | Parker et al. | 204/159.22 |
| 3,720,592 | 3/1973 | Mani | 204/159.15 |
| 3,754,054 | 8/1973 | Kimura et al. | 204/159.15 X |
| 3,770,602 | 11/1973 | D'Alelio | 204/159.15 |
| 3,785,849 | 1/1974 | Parker et al. | 204/159.22 |
| 3,793,293 | 2/1974 | Ray-Chaudhuri et al. | 260/47 UA |
| 3,804,735 | 4/1974 | Radlove et al. | 204/159.23 |
| 3,840,390 | 10/1974 | Kozu et al. | 526/271 X |
| 3,878,076 | 4/1975 | Nishikubo et al. | 204/159.15 |
| 3,926,639 | 12/1975 | Rosen et al. | 96/115 R |
| 4,010,289 | 3/1977 | Kobayashi et al. | 427/54 |
| 4,042,645 | 8/1977 | Hirota et al. | 526/271 X |

*Primary Examiner*—Murray Tillman
*Assistant Examiner*—Thurman K. Page
*Attorney, Agent, or Firm*—James & Franklin

[57] ABSTRACT

Actinic radiation curable compositions comprise chemically bonded portions of at least one free radical polymerizable hydroxyalkyl ester of an alpha, beta unsaturated carboxylic acid, at least one non-halogenated cyclic anhydride, at least one epoxide and a halogenated free radical initiator which is activatable by actinic radiation. Upon exposure to actinic radiation, these compositions are cured with very little or no inhibition by atmospheric oxygen.

9 Claims, No Drawings

ACTINIC RADIATION CURABLE COMPOSITIONS

CROSS REFERENCE TO RELATED APPLICATIONS

This application is a continuation-in-part of our U.S. application, Ser. No. 453,817, filed Mar. 22, 1974 now abandoned.

BACKGROUND OF THE INVENTION

This invention relates to actinic radiation curable compositions. More particularly, this invention relates to oxygen insensitive actinic radiation curable polymerizable compositions.

It is well known that actinic radiation curable compositions useful as coatings generally comprise a low molecular weight polyunsaturated resin dissolved in a selected combination of vinyl monomers and a relatively small amount of a photoinitiator. The preparation of such compositions usually involves partially reacting the monomers used in the resinous portion to form the respective ethylenically unsaturated prepolymer prior to coating. The resulting substance is coated onto a substrate and then cured by exposing it to high energy light. That is to say, upon exposure of the coated substance to actinic radiation, curing of the coating is effected as the free-radical polymerization of the ethylenically unsaturated prepolymer occurs, thereby forming a crosslinked polymer on the substrate.

It is also well known that the curing of actinic radiation polymerizable coatings is often inhibited by atmospheric oxygen. When this occurs, the propagation of the polymer chains is terminated as a result of the degradation of the growing radicals into stable, insufficiently reactive peroxides. Therefore it is imperative that such oxygen inhibition be avoided or minimized to ensure efficient curing of such polymerizable compositions.

Heretofore various methods have been utilized to prevent oxygen inhibition of actinic radiation curable coatings. The most commonly used methods involve the exclusion of oxygen from the surface of the applied film either by blanketing the coated surface with an inert atmosphere, e.g. nitrogen or argon, or by including a waxy substance, e.g., paraffin, in the coating formulation which migrates to the surface during curing to form an oxygen barrier, and curing with a medium pressure mercury lamp. Each of these prior art methods has inherent drawbacks. The inert atmosphere method requires specially adapted exposure equipment; the waxy coating method is slow curing and requires stripping of the wax topping and post-finishing. Still other methods, such as the use of large amounts of polymerization initiator or long radiation exposure periods, have proven considerably less successful. For example, when a particular formulation is altered significantly, it is often difficult to compensate for any concomitant undesired change in properties. On the other hand, a too long exposure time often results in excessive decomposition of the photoinitiator or other deleterious effects. Hence, there exists the need for photocurable compositions which are insensitive to atmospheric oxygen and capable of being rapidly cured to form the desired finished product.

Thus, it is the prime object of this invention to provide actinic radiation curable compositions which can be cured with extremely little or no inhibition by atmospheric oxygen. It is still a further object of this invention to provide actinic radiation curable coatings characterized by their ability to be applied to a wide variety of substrates and subsequently cured.

Various other objects and advantages of this invention will become apparent from the following description thereof.

SUMMARY OF THE INVENTION

We have now found that actinic radiation curable compositions, capable of being cured with little or no inhibition by atmospheric oxygen, can be prepared by using a prepolymer obtained by chemically bonding a polymerizable free-radical photoinitiator to a vinyl monomer, and more specifically, by chemically bonding a halogenated anhydride photoinitiator to a free-radical polymerizable hydroxyalkyl ester of an alpha, beta unsaturated carboxylic acid, a non-halogenated cyclic anhydride and an epoxide. The improved curability of the resulting coating formulations is realized when the crosslinked polymers are produced, in situ, on the substrate, upon exposure to actinic radiation.

DESCRIPTION OF THE PREFERRED EMBODIMENTS

In accordance with the present invention, the prepolymers of these novel photocurable coatings are characterized by the presence of terminal unsaturation and are prepared by chemically bonding (a) from about 1.0 to about 48.0 mole percent of a hydroxyalkyl ester of an alpha, beta unsaturated carboxylic acid, wherein the alkyl group of the ester moiety contains from 2 to 20 carbon atoms and the acid moiety contains from 3 to 4 carbon atoms; (b) from about 1.0 to about 48.0 mole percent of at least one free-radical initiator activatable by actinic radiation and comprising a halogenated alicyclic or aromatic anhydride having from 5 to 15 carbon atoms and being devoid of groups which will inhibit free-radical polymerization; (c) from about 1.0 to about 48.0 mole percent of at least one nonhalogenated cyclic anhydride containing from 4 to 10 carbon atoms; and (d) from about 1.0 to about 48.0 mole percent of at least one epoxide containing from 2 to 8 carbon atoms and selected from the group consisting of epoxyalkyl acrylates and methacrylates and alkylene oxides.

In addition to a prepolymer having a particular formulation encompassed within the foregoing general description, the compositions of the present invention optionally may include up to an equimolar amount of a non-chemically bonded copolymerizable diluent monomer as described hereinafter.

The polymerizable esters of alpha, beta unsaturated carboxylic acids which are preferred in the preparation of the prepolymers of the photocurable coatings of this invention are the hydroxyalkyl esters of acrylic acid and methacrylic acid, wherein the alkyl groups contain from 2 to 20 carbon atoms. Examples of such compounds are hydroxyethyl acrylate, hydroxypropyl acrylate, hydroxybutyl acrylate, hydroxypentyl acrylate, hydroxyhexyl acrylate, hydroxyheptyl acrylate, hydroxyoctyl acrylate, hydroxynonyl acrylate, hydroxydecyl acrylate hydroxyundecyl acrylate, etc., as well as the corresponding hydroxyalkyl methacrylates and combinations thereof.

The preferred photoinitiators are the halogenated aromatic anhydrides such as tetrachlorophthalic anhydride, tetrabromophthalic anhydride and the halogenated alicyclic anhydrides such as 1,4,5,6,7,7-hexachloro-5-norbornene-2,3-dicarboxylic anhydride.

The preferred cyclic anhydrides used in the preparation of the prepolymers of the present photocurable coatings are those containing from 4 to 10 carbon atoms, particularly succinic anhydride, phthalic anhydride, maleic anhydride and the like.

The preferred epoxies used in the preparation of the prepolymers of the present photocurable coatings are monoepoxides containing from 2 to 8 carbon atoms and selected from the group consisting of the epoxyalkyl acrylates and methacrylates and alkylene oxides. Suitable compounds include glycidyl acrylate, glycidyl methacrylate, allyl glycidyl ether, vinyl cyclohexene monoepoxide, epichlorohydrin, 1,2-epoxybutane, ethylene oxide, propylene oxide and the glycidyl ethers of fatty alcohols.

The photocurable compositions of this invention may optionally employ, as mentioned above, a mono or polyfunctional unsaturated diluent capable of copolymerizing with the unsaturated portion of the prepolymer, upon exposure to actinic radiation. Suitable useful materials include (i) the acrylic and methacrylic acids; (ii) the hydroxyalkyl esters of said acids, wherein the alkyl chains contain from 2 to 20 carbon atoms, e.g., 2-hydroxyethyl acrylate, hydroxypropyl acrylate, hydroxybutyl acrylate, hydroxypentyl acrylate, hydroxyhexyl acrylate, hydroxyheptyl acrylate, hydroxyoctyl acrylate, etc., and the corresponding hydroxyalkyl methacrylates; (iii) the glycidyl ester derivatives of said acids; (iv) the ethylene glycol and polyethylene glycol diesters of said acids, e.g., ethylene glycol diacrylate, diethylene glycol diacrylate, triethylene glycol diacrylate, tetraethylene glycol diacrylate, etc., and the corresponding ethylene glycol dimethacrylate and polyethylene glycol methacrylates; (v) the polyhydric alcohol ester derivatives of said acids, e.g., the pentaerythritol tri- and tetraacrylates and the corresponding methacrylates; (vi) the non-gem alkanediol ester derivatives of said acids, e.g., 1,6-hexanediol diacrylate, 1,4-butylene diacrylate the alkyl- and alkyl substituted alkyl acrylates and methacrylates, wherein the alkyl groups contain from 2 to 20 carbon atoms, e.g., ethyl acrylate, ethyl methacrylate, propyl acrylate, propyl methacrylate, 2-ethylhexyl acrylate, etc.; and (vii) the cycloalkyl ester derivatives of said acids, wherein the cycloalkyl groups contain from 5 to 14 carbon atoms, e.g., cyclohexyl acrylate or cyclohexyl methacrylate.

The photocurable prepolymers of this invention are prepared by esterifying the photoinitiator with the hydroxyalkyl acrylate or methacrylate and the remaining required ingredients at a temperature between about 60° C and about 120° C. The prepolymerization reaction is continued until the reaction is substantially complete. Complete reaction is usually obtained upon reacting the ingredients over a period of between 28 and 35 hours. Obviously, the practitioner will realize that the actual reaction time will be dictated by the particular ingredients and, perhaps more so, by reaction temperature and relative concentrations of ingredients. When prepolymers having acid terminal groups are desired, the acidic component of the ingredients should be used in slight stoichiometric excess. In this case the acid number of the prepolymer may be in excess of 100. When hydroxyl terminated polymers are desired, the hydroxyl or epoxide containing ingredient should be in slight excess and the reaction should be continued until the polymer has an acid number of less than 7.0, preferably less than 3.0.

In the practice of this invention, it is preferred that the photocurable prepolymer compositions comprise (1) from 6.0 to 15.0 mole percent of 2-hydroxyethyl acrylate of 2-hydroxyethyl methacrylate or 2-hydroxypropyl methacrylate; (2) from 6.0 to 15.0 mole percent of a photoinitiator selected from the group consisting of tetrachlorophthalic anhydride, tetrabromophthalic anhydride, 1,4,5,6,7,7-hexachloro-5-norbornene-2,3-dicarboxylic anhydride and mixtures thereof; (3) from 28.0 to 40.0 mole percent of succinic anhydride, phthalic anhydride, maleic anhydride or mixtures thereof; and (4) from 42.0 to 47.0 mole percent of epichlorohydrin, glycidyl methacrylate, glycidyl acrylate or mixtures thereof.

In the practice of this invention, it is preferred that prepolymerization be carried out at 70° C. until the acid number of the particular composition is determined to be between 0.5 and 3.0.

If desired, conventional non-chemically functional additives may be incorporated into the novel photocurable coating compositions of this invention in order to modify the properties thereof. Among these additives may be included: organic solvents such as acetone or methylethyl ketone; fillers such as finely ground polymer resins; free-radical polymerization inhibitors such as p-methoxyphenol and the like; pigments such as titanium dioxide, barium sulphate and the like; and ultraviolet light transparent dyes such as Brilliant Violet B, Fast Red 8BLX, etc.

In using the novel actinic radiation curable coating compositions for the preparation of gloss overcoats, protective coatings, printing or decorative coatings, etc., they may be applied to the substrate by means of any conventional coating technique. Since the adaptability of a suitable method of coating, notwithstanding the viscosity of the coating composition, will depend, to some extent, on the shape or form of the substrate, selection of a particular technique is left to the practitioner. Thus, the novel photocurable coating compositions may be sprayed onto a selected substrate or they may be applied by use of any mechanical coating process such as air knife, trailing blade, knife coater, reverse roll, or gravure coating techniques.

The photocurable compositions of this invention may usually be coated at the temperatures at which they are prepared or at room temperature, i.e., about 20° C. On the other hand, the practitioner may desire to adjust the viscosity of a stored composition in order to facilitate coating. The particular method selected for this purpose and the feasibility thereof will depend considerably on the rheological properties of the composition. For example, in order to reduce viscosity it may be necessary to slightly heat a composition which primarily consists of an esterified hydroxyalkyl acrylate or methacrylate or, more preferably, a viscosity reducing diluent may be added prior to coating. The present photocurable coatings are generally applied to coating weights which yield a dry film thickness of about 0.4 to 3.0 mils. The coating weights at which these photocurable compositions will be applied will, of course, vary according to the particular composition utilized, the selected substrate, and the specific end-product contemplated.

Our photocurable compositions may be coated onto a virtually unlimited variety of substrates, including paper, cloth, paperboard, metal sheets and foils, glass, fiber glass, foamed plastics, rubber, cellophane, wood and plastic films and sheets, such as those derived from polyethylene teraphthalate, polystyrene, rubber hydrochloride, polyvinyl chloride, polyvinylidene chloride, and any substrate where there is sufficient adhesion to the coated film. Moreover, these novel photocurable products may be used as adhesives to laminate two substrates, of which at least one can be penetrated by actinic radiation.

Subsequent to application, regardless of the ultimate intended use, the film is cured upon exposure to actinic radiation. That is to say, the free radical polymerization of the prepolymer and the crosslinking of the ethylenically unsaturated portions therein with any vinyl comonomers present is initiated by absorption of high energy light. The present photocurable coatings are characterized by their stability and, more importantly, their oxygen insensitivity, especially during curing.

In order to cure the photopolymerizable coating compositions of this invention, it is merely necessary to expose the coated film to an actinic radiation source, i.e., to radiation having a wavelength from 2000 A to 4000 A., for a period of time which is sufficient to accomplish the desired amount of free-radical polymerization. Obviously, since the source of radiation and the length of exposure, as well as the distance between the source and the coated film, will depend on the particular composition and film thickness, the selection of the most suitable means of exposure is left to the practitioner.

As noted, the free-radical polymerization with the present photocurable compositions is conducted after it has been coated onto the desired substrate, i.e., formed into a shaped article. This sequence of steps is preferred when the particular coating is intended for a non-adhesive use, e.g., a protective coating, a gloss overcoating, etc. On the other hand, since these uncured photocurable coating compositions display appreciable tack, tension and cohesive characteristics, it is preferred that a removable cover sheet be utilized whenever it is elected to delay curing for a considerable period.

EXAMPLES

The following examples will further illustrate the embodiments of our invention. It should be noted that in these examples, benzyl trimethyl ammonium chloride was used as a catalyst and p-methoxyphenol as a free-radical inhibitor, and all quantities are given in terms of grams, unless otherwise specified.

EXAMPLE I

This example illustrates the usefulness of a glycidyl ester of an alpha, beta unsaturated carboxylic acid, a hydroxy alkyl ester of another alpha, beta unsaturated carboxylic acid, and a polyhalogenated aromatic initiator, in combination with a cyclic aliphatic anhydride, as the prepolymer of an actinic radiation polymerizable coating composition in accordance with this invention.

Said composition was prepared as follows. A 1000 milliliter flask was protected from light, mounted on a water bath, and equipped with a condenser thermometer and a mechanical stirrer. Into said flask were introduced the following ingredients:

| Ingredient | Amount (grams) |
| --- | --- |
| 2-Hydroxyethyl acrylate | 34.8 |
| Succinic anhydride | 60.1 |
| Glycidyl methacrylate | 128.0 |
| Tetrachlorophthalic anhydride | 85.8 |
| Benzyl trimethyl ammonium chloride | 1.5 |
| p-Methoxyphenol | 0.3 |

The above described ingredients were continuously stirred, and the temperature of the resulting mixture was raised to and maintained at about 70° C until the reaction was complete, as indicated by an acid number (based on the number of milligrans of potassium hydroxide required to neutralize 1 gm. of the resulting compositon) between approximately 0.7 and 0.8. The thusly prepared composition was cooled to room temperature (22° C) and a portion thereof was tested for curability in the following manner:

Several glass slides were each coated to a thickness of about 3 mils with the above described composition, using a wire wound rod. The coated slides were then exposed to actinic radiation for about 1.3 second by means of a commercially available, conveyorized ultraviolet light exposure unit. The moving belt conveyed the coated slides through the exposure cavity which housed two ultraviolet lamps, at a rate of 20 feet per minute. Upon completion of the exposure operations, it was observed that all of the coatings cured without any oxygen inhibition. The excellent curability properties of each coating composition were indicated by its uniform hardness throughout and the absence of any surface tackiness. Furthermore, the cured coating compositions remained well adhered to the glass supports and did not chip or flake.

EXAMPLE II

This example illustrates the effectiveness of a prepolymer consisting of a glycidyl ester of an alpha, beta unsaturated carboxylic acid, a hydroxyalkyl ester of another alpha, beta unsaturated carboxylic acid, and a polyhalogenated aromatic initiator, in combination with various other ingredients, in an actinic radiation polymerizable coating composition in accordance with this invention.

The procedural steps employed in Example I, were repeated to make a coating composition having the following formulation:

| Ingredients | Amount (grams) |
| --- | --- |
| 2-Hydroxyethyl acrylate | 23.2 |
| Succinic anhydride | 120.1 |
| Tetrachlorophthalic anhydride | 57.2 |
| Epichlorohydrin | 55.5 |
| Glycidyl methacrylate | 113.6 |
| Benzyl trimethyl ammonium chloride | 1.5 |
| p-Methoxyphenol | 0.37 |

When exposed to ultraviolet light by the method utilized in Example I, coatings of the present composition on glass slides displayed oxygen insensitive curability and lamination properties comparable to those of the cured coatings in the referred to example.

EXAMPLE III

This example illustrates the usefulness of a brominated aromatic initiator in the prepolymer of an actinic radiation polymerizable coating composition in accordance with this invention.

To make the above described coating composition, the preparative steps outlined in Example I were repeated, using the following ingredients in the indicated amounts:

| Ingredient | Amount (grams) |
| --- | --- |
| 2-Hydroxyethyl acrylate | 34.8 |
| Maleic anhydride | 58.8 |
| Glycidyl methacrylate | 128.0 |
| Tetrabromophthalic anhydride | 139.0 |

-continued

| Ingredient | Amount (grams) |
|---|---|
| Benzyl trimethyl ammonium chloride | 1.8 |
| p-Methoxyphenol | 0.37 |

Portions of the reacted composition were coated on glass slides and exposed to ultraviolet radiation in the manner utilized therefor in Example I. The curability and overall coating properties of the present composition were comparable to those of the preceding examples.

EXAMPLE IV

This example further illustrates the usefulness of a brominated aromatic initiator in an actinic radiation polymerizable composition in accordance with this invention.

The preparative method set forth in Example I hereinabove was utilized to make the instant composition. The formulation of said composition consisted of 23.2 grams of hydroxyethyl acrylate, 58.9 grams of maleic anhydride, 60.1 grams of succinic anhydride, 92.7 grams of tetrabromophthalic anhydride, 198.0 grams of glycidyl methacrylate, 2.2 grams of benzyl trimethyl ammonium chloride, and 0.4 grams of p-methoxyphenol. Upon exposure to ultraviolet radiation by the method described in Example I, samples of the present composition, coated on glass slides in a manner similar to that utilized in said example, displayed excellent oxygen insensitive curability and overall coating preperties.

EXAMPLE V

This example illustrates the usefulness of a hydroxypropyl ester of an alpha, beta unsaturated carboxylic acid, a glycidyl ester of the same acid, an ethylenically unsaturated cyclic anhydride, and a halogenated aromatic photoinitiator in the prepolymer of a photocurable coating, in accordance with this invention.

To make the instant photocurable coating composition, the procedural steps employed in Example I were repeated, except the flask was charged with 43.2 grams of hydroxypropyl methacrylate, 58.8 grams of maleic anhydride, 128.0 grams of glycidyl methacrylate, 85.7 grams of tetrachlorophthalic anhydride, 1.7 grams of benzyl trimethylammonium chloride and 0.3 grams of p-methoxyphenol.

When a portion of the above described, prepolymerized composition was coated on glass slides and exposed to ultraviolet light, using the respective methods employed in Example I, it was observed that the curability and overall coating properties of the present composition were comparable to those of the preceding example.

EXAMPLE VI

This example further illustrates the usefulness of a halogenated alicyclic initiator in an actinic radiation polymerizable composition in accordance with this invention.

The procedural steps employed in Example I were again repeated, except the flask was charged with 34.8 grams of 2-hydroxyethyl acrylate, 58.8 grams of maleic anhydride, 128 grams of glycidyl methacrylate, 111.3 grams of 1,4,5,6,7,7-hexachloro-5-norbornene-2,3 dicarboxylic anhydride, 1.7 grams of tetramethyl ammonium chloride and 0.3 grams of p-methoxyphenol.

After the respective prepolymer was formed, using the method described in Example I, a portion of the resulting composition having the above formulation was coated on several glass slides and exposed as outlined in said example. Curability and overall coating properties of the composition tested herein were comparable to those obtained in Example IV.

EXAMPLE VII-XIII

These examples illustrate the usefulness of a particular halogenated aromatic initiator, at varied concentrations, in actinic radiation polymerizable compositions in accordance with this invention.

To form the prepolymers, the detailed procedure set forth in Example I was utilized in each case. The formulations of the compositions were as follows:

| Ingredient | Example No. and Amount of Ingredient (gms) | | | | | | |
|---|---|---|---|---|---|---|---|
| | VII | VIII | IX | X | XI | XII | XIII |
| 2-Hydroxyethyl acrylate | 34.8 | 34.8 | 34.8 | 40.9 | 34.8 | 34.8 | 58.0 |
| Glycidyl methacrylate | 298.2 | 170.4 | 128.0 | 100.2 | 128.0 | — | — |
| Tetrachlorophthalic anhydride | 85.8 | 85.8 | 85.7 | 100.6 | 85.8 | 85.8 | 143.0 |
| Maleic anhydride | 88.3 | 88.3 | 58.8 | 34.5 | — | 58.8 | — |
| Phthalic anhydride | — | — | — | — | 88.9 | — | — |
| Glycidyl acrylate | — | — | — | — | — | 115.1 | — |
| Succinic anhydride | 90.1 | — | — | — | — | — | — |
| Benzyl trimethyl ammonium chloride | 3.0 | 1.9 | 1.6 | 1.0 | 1.7 | 1.0 | 1.0 |
| P-methoxyphenol | 0.6 | 0.3 | 0.31 | 0.2 | 0.3 | 0.1 | 0.2 |
| Mole percent of TCPA initiator | 6.7 | 11.1 | 14.4 | 20.0 | 14.4 | 14.4 | 50.0 |

When coated on glass slides and exposed to ultraviolet radiation, using the respective method similarly employed therefor in Example I, each of the above described compositions cured without any oxygen inhibition and displayed coating and adhesive properties comparable to those of the preceding examples. It is to be noted that Example XIII which contained only the 2-hydroxyethyl acrylate with the photoinitiator resulted in a cured surface which could be scratched more easily so it would not be as adaptable for use as an overcoat when compared with the compositions of the remaining examples.

EXAMPLES XIII-XV

These examples illustrate the usefulness of various ethylenically unsaturated comonomers as diluents in the photocurable coating composition in accordance with this invention.

In each case in a series of three photocurable coating compositions, XIII, XIV and XV, prepared according to the method described in Example I, a particular ethylenically unsaturated comonomer was employed with 50 grams of a prepolymer having the same formulation as that in Example IX. The vinyl type comonomeric diluent utilized in Example XIII consisted of 30 grams of 2-hydroxyethyl acrylate; that of Example XIV, 40 grams of pentaerythritol tetraacrylate and that of Example XV, 20 grams of 1,6-hexanediol diacrylate.

When portions of the above described compositions were coated on glass slides using the method similarly employed therefor in Example I, it was observed that the comonomeric diluents altered the application viscosities of the compositions. Furthermore, it was observed that when the coated glass slides were exposed to ultraviolet light according to the method utilized in Example I, each of the compositions cured rapidly without any oxygen inhibition, and that the cured coatings displayed excellent overall quality, i.e., smoothness, glossiness and hardness.

In addition to an ability to be cured without incurring inhibition due to atmospheric oxygen, the photocurable compositions of this invention offer the advantage of their stability when stored over a considerable period.

Summarizing, it is thus seen that this invention provides novel photocurable coating compositions characterized by their ability to be rapidly cured, upon exposure to actinic radiation, without being affected by atmospheric oxygen. It is also seen that this invention provides novel oxygen-insensitive, photocurable coating and adhesive compositions which can be rapidly cured by means of conventional actinic radiation exposure techniques and are therefore readily adaptable to a wide variety of industrial and other type operations wherein such substances are called for.

It is understood that variations in proportions, procedures, and materials stated in the disclosure may be made without departing from the spirit and scope of this invention as defined in the following claims.

What is claimed is:

1. An actinic radiation curable prepolymeric composition of matter characterized by the presence of terminal unsaturation consisting essentially of the reaction product of:
   (a) from about 1.0 to about 48.0 mole percent of a hydroxyalkyl ester of an alpha, beta unsaturated carboxylic acid, wherein the alkyl group of the ester moiety contains from 2 to 20 carbon atoms, and the acid moiety contains from 3 to 4 carbon atoms;
   (b) from about 1.0 to about 48.0 mole percent of at least one polymerizable free-radical initiator activatable by actinic radiation and selected from the group consisting of tetrachlorophthalic anhydride, tetrabromophthalic anhydride and 1,4,5,6,7,7-hexachloro-5-norbornene-2,3-dicarboxylic anhydride and mixtures thereof;
   (c) from about 1.0 to about 48.0 mole percent of at least one nonhalogenated cyclic anhydride containing from 4 to 10 carbon atoms; and
   (d) from about 1.0 to about 48.0 mole percent of at least one epoxide containing 2 to 8 carbon atoms and selected from the group consisting of epoxyalkyl acrylates and methacrylates and alkylene oxides.

2. The actinic radiation curable composition of claim 1 wherein there is additionally present up to an equimolar amount of at least one nonchemically bonded, copolymerizable acrylic diluent monomer selected from the group consisting of acrylic and methacrylic acids; the hydroxyalkyl esters of said acids, wherein the alkyl chains contain from 2 to 20 carbon atoms; the glycidyl ester derivatives of said acids; the non-gem alkanediol ester derivatives of said acids, wherein the alkyl groups contain from 2 to 20 carbon atoms; the ethylene glycol and polyethylene glycol ester derivatives of said acids; the polyhydric alcohol ester derivatives of said acids; and the cycloalkyl ester derivatives of said acids, wherein the cycloalkyl groups contain from 5 to 14 carbon atoms.

3. The actinic radiation curable composition of claim 1 wherein said component (a) is 2-hydroxyethyl acrylate.

4. The actinic radiation curable composition of claim 1 wherein said component (a) is 2-hydroxyethyl methacrylate.

5. The actinic radiation curable composition of claim 1 wherein said component (c) is selected from the group consisting of succinic anhydride, maleic anhydride, phthalic anhydride and mixtures thereof.

6. The actinic radiation curable composition of claim 1 wherein said component (d) is selected from the group consisting of glycidyl acrylate, glycidyl methacrylate, epichlorohydrin and mixtures thereof.

7. The actinic radiation curable composition of claim 1 comprising (a) from 6.0 to 15.0 mole percent of a member of the group consisting of 2-hydroxyethyl acrylate, 2-hydroxyethyl methacrylate, 2-hydroxypropyl methacrylate and mixtures thereof; (b) from 6.0 to 15.0 mole percent of a photoinitiator selected from the group consisting of tetrachlorophthalic anhydride, tetrabromophthalic anhydride and 1,4,5,6,7,7-hexachloro-3-norbornene-2,3-dicarboxylic anhydride and mixtures thereof; (c) from 28.0 to 40.0 mole percent of a member of the group consisting of succinic anhydride, phthalic anhydride, maleic anhydride and mixtures thereof; and (d) from 42.0 to 47.0 mole percent of a member of the group consisting of epichlorohydrin, glycidyl methacrylate, glycidyl acrylate and mixtures thereof.

8. A cured composition of matter prepared by exposing the composition of claim 1 to actinic radiation of 2000 to 4000 A.

9. A coated article comprising a substrate and on said substrate a coating of a cured composition according to claim 8.

* * * * *